United States Patent
Holderby et al.

(10) Patent No.: US 10,330,825 B2
(45) Date of Patent: Jun. 25, 2019

(54) COMPLEX FRACTURE NETWORK MAPPING

(71) Applicant: Halliburton Energy Services, Inc., Houston, TX (US)

(72) Inventors: Eric Sullivan Holderby, Fort Worth, TX (US); Shameem Siddiqui, Richmond, TX (US); Ronald Glen Dusterhoft, Katy, TX (US); Ian Michael Adams, Grand Prairie, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 514 days.

(21) Appl. No.: 14/645,519

(22) Filed: Mar. 12, 2015

(65) Prior Publication Data

US 2016/0266278 A1    Sep. 15, 2016

(51) Int. Cl.
| | |
|---|---|
| *G01V 99/00* | (2009.01) |
| *G01V 1/28* | (2006.01) |
| *G01V 1/40* | (2006.01) |

(52) U.S. Cl.
CPC ............ *G01V 99/005* (2013.01); *G01V 1/288* (2013.01); *G01V 1/40* (2013.01)

(58) Field of Classification Search
None
See application file for complete search history.

(56) References Cited

U.S. PATENT DOCUMENTS 9,085,957 B2 *   7/2015   Wallace ................. E21B 43/00

FOREIGN PATENT DOCUMENTS

WO     2013026591 A1    5/2013

OTHER PUBLICATIONS

Ron Dusterhoft, Enabling Cross Discipline Collaboration and Forward Modeling Through Advanced Subsurface Geocellular Earth Modeling, Sep. 22-24, 2014, 9 pages.*
Holderby, Eric, et al. "Case study: Completion design optimization for barnett oil producing area." In SPE Annual Technical Conference and Exhibition. Society of Petroleum Engineers, 2014. SPE 170750 MS.
Holderby, E. S., et al. "Advances in the Use of New-Age Complex Fracture Modeling, Earth Modeling, and Reservoir Simulation Tools as an Asset Well Planning Tool." In 49th US Rock Mechanics/Geomechanics Symposium. American Rock Mechanics Association, 2015.

* cited by examiner

*Primary Examiner* — Tung S Lau
(74) *Attorney, Agent, or Firm* — John W. Wustenberg; Baker Botts L.L.P.

(57) ABSTRACT

In some aspects, the present disclosure includes systems and methods for modeling a fracturing operation in a subsurface formation. The method includes generating an earth model of the subsurface formation, wherein the earth model is generated considering unstructured gridding; generating a fracture model of the subsurface formation based, at least in part, on the earth model of the subsurface formation, and wherein the fracture model is generated considering unstructured gridding; and performing a reservoir simulation of at least one reservoir in the subsurface formation based, at least in part, on the earth model and the fracture model, wherein the reservoir simulation is performed using unstructured gridding.

20 Claims, 9 Drawing Sheets

COMPLEX FRACTURE NETWORK MAPPING

BACKGROUND

Hydrocarbons, such as oil and gas, and other fluids are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, such as drilling a subterranean formation, it is often desirable to perform wellbore enhancement operations to enhance the production from a reservoir in the subsurface formation. In unconventional reservoirs, enhancement operations may induce fractures with complex geometries. It may be useful to predict, at least in part, these fractures to optimize fracturing operations and increase production from the unconventional reservoir.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present disclosure includes methods, systems, and software to model complex fractures in a subsurface formation. Embodiments of the present disclosure use an earth model to plan complex fractures in unconventional reservoirs. In general, an unconventional reservoir is one that will not produce significant amounts of fluid without an enhancement operation. Example unconventional reservoirs include shale formations.

Figure 1:
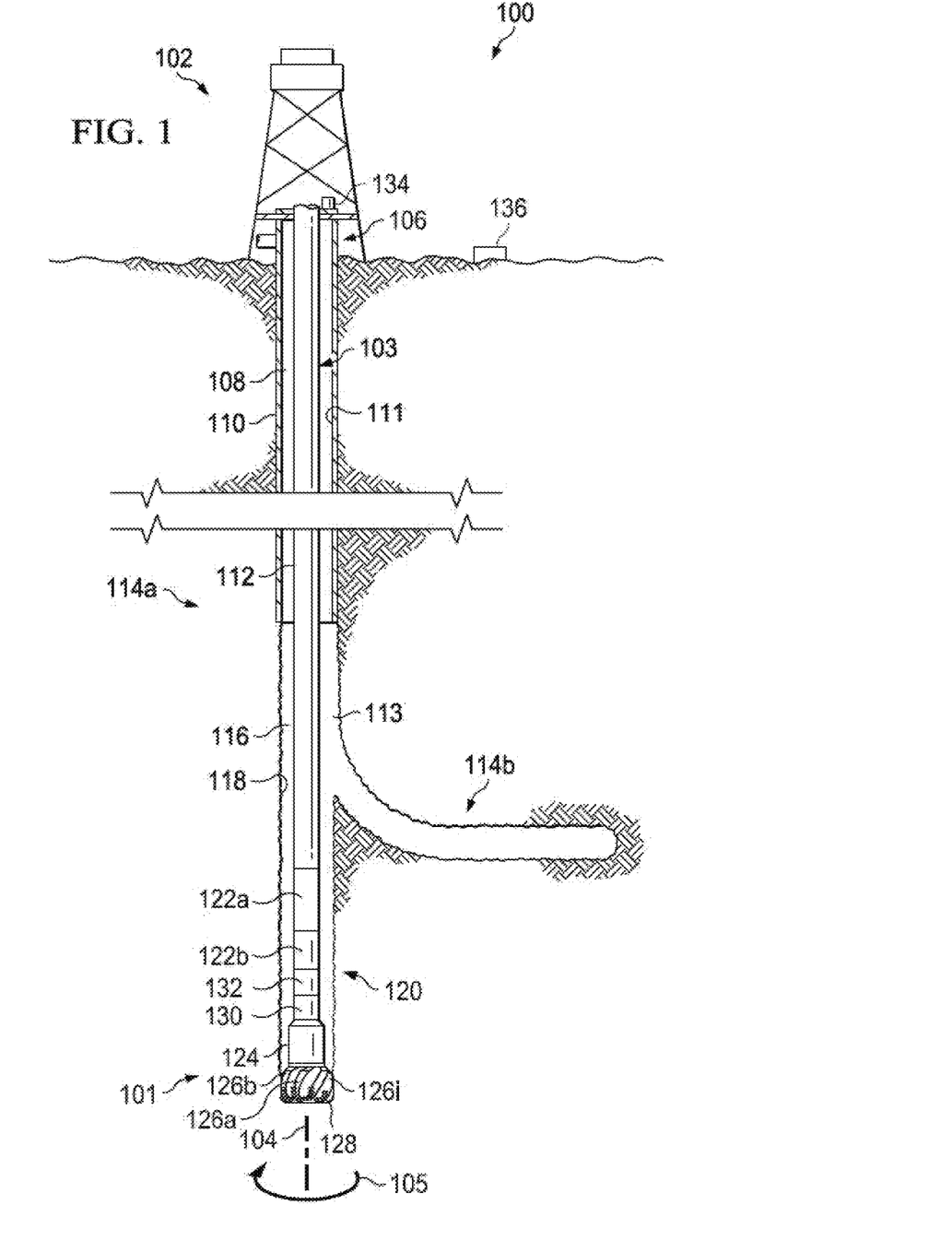
FIG. 1 illustrates an elevation view of an example embodiment of a drilling system used in an illustrative wellbore drilling environment, in accordance with some embodiments of the present disclosure.

FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD and wireline logging. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and the logging tool may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drillstring 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drillstring 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of the wellbore 114.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drillstring 103 to attached drill bit 101. The drilling fluids may be directed to flow from drillstring 103 to respective nozzles passing through rotary drill bit 101. The drilling fluid may be circulated back to well surface 106 through annulus 108 defined in part by outside diameter 112 of drillstring 103 and inside diameter 118 of wellbore 114. Inside diameter 118 may be referred to as the "sidewall" of wellbore 114. Annulus 108 may also be defined by outside diameter 112 of drillstring 103 and inside diameter 111 of casing string 110. Open hole annulus 116 may be defined as sidewall 118 and outside diameter 112.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drillstring 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering and/or any other commercially available well tools. Further, BHA 120 may also include a rotary drive (not expressly shown) connected to components 122a, and 122b and which rotates at least part of drillstring 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drillstring 103 (e.g., in BHA 120 and/or as part of logging tool 130) or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130.

MWD tool 130 may be integrated into drilling system 100 at any point along the drillstring 103. Multiple MWD tools 130 may be located along the length of the drillstring. MWD tool 130 may include one or more sensors. The sensors may include one or more measurement-while-drilling (MWD) tool sensors, such as strain gauges, accelerometers, and acoustic sensors. Other example sensors include one or more sensors to measure formation properties, such as acoustic, neutron, gamma ray, density, photoelectric, nuclear magnetic resonance, induction, resistivity, caliper, coring, or seismic sensors. Still other example sensors include one or more sensors to measure fluid properties, such as one or more of fluid flow rate or density. Each of the sensors produces an output indicative of the property measured by the sensor. MWD tool 130 may further include processor to operate the one or more sensor and to receive the outputs from the sensors.

Telemetry sub 132 may be included on drillstring 103 to transfer measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drillstring. Drilling system 100 may also include facilities (not expressly shown) that include computing equipment configured to collect, process, and/or store the measurements received from sensors on logging tool 130, and/or surface receiver 136, or from sensors at other locations along the drillstring. The facilities may be located onsite at the wellbore or offsite at a location away from the wellbore.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

Figure 2:
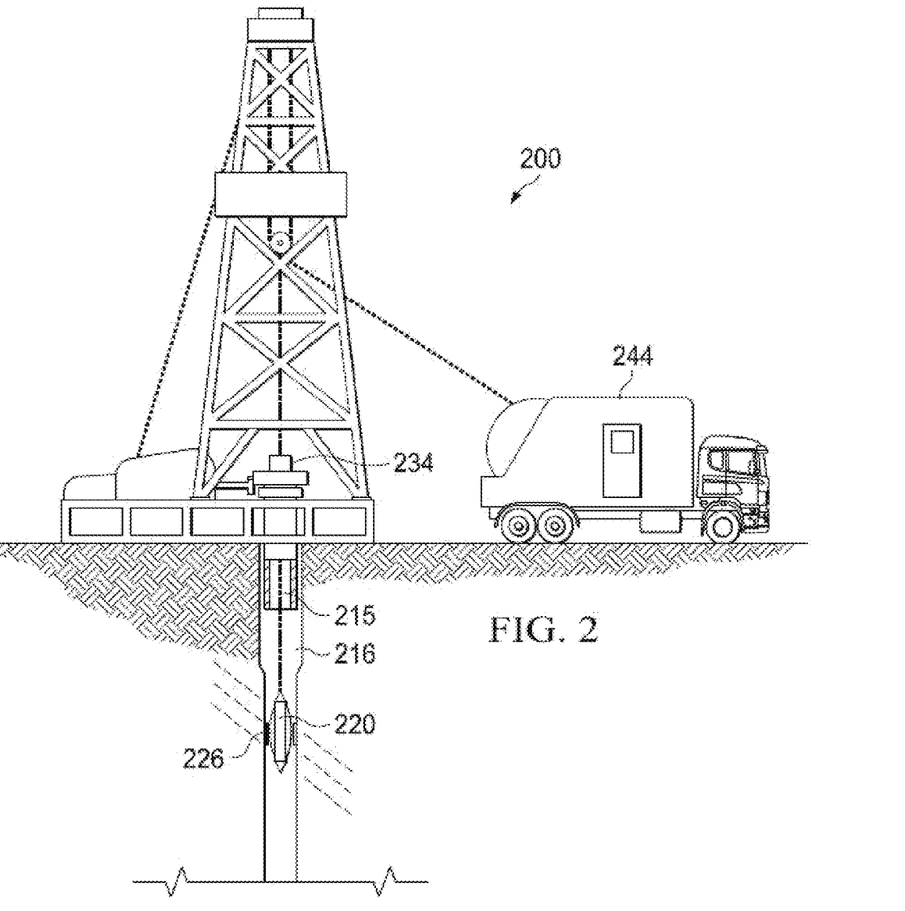
FIG. 2 illustrates an elevation view of an example embodiment of a downhole system used in an illustrative logging environment with the drillstring removed, in accordance with some embodiments of the present disclosure.

At various times during the drilling process, drillstring 103 may be removed from wellbore 114 and a wellbore logging tool may be used to obtain information about the subterranean formation. FIG. 2 illustrates an elevation view of an example embodiment of drilling system 200 used in an illustrative logging environment with the drillstring removed, in accordance with some embodiments of the present disclosure. Subterranean operations may be conducted using wireline system 220 once the drillstring has been removed, though, at times, some or all of the drillstring may remain in wellbore 114 during logging with wireline system 220. Wireline system 220 may include one or more logging tools 226 that may be suspended in wellbore 216 by conveyance 215 (e.g., a cable, slickline, or coiled tubing). Logging tool 226 may be similar to logging tool 130, as described with reference to FIG. 1. Logging tool 226 may be communicatively coupled to conveyance 215. Conveyance 215 may contain conductors for transporting power to wireline system 220 and telemetry from logging tool 226 to logging facility 244. Alternatively, conveyance 215 may lack a conductor, as is often the case using slickline or coiled tubing, and wireline system 220 may contain a control unit similar to control unit 134, shown in FIG. 1, that contains memory, one or more batteries, and/or one or more processors for performing operations and storing measurements. In certain embodiments, system 200 may include control unit 234, positioned at the surface, in the wellbore (e.g., in conveyance 215 and/or as part of logging tool 226) or both (e.g., a portion of the processing may occur downhole and a portion may occur at the surface). Control unit 234 may include a control system or a control algorithm. In certain embodiments, a control system, an algorithm, or a set of machine-readable instructions may cause control unit 234 to generate and provide an input signal to one or more elements of drillstring 103, such as the sensors along the drillstring 103. The input signal may cause the sensors to be active or to output signals indicative of sensed properties. Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. In certain example embodiments, control unit 234, which may be located in logging tool 226, may perform one or more functions of the computing facility. An example of a computing facility is described with more detail with reference to FIG. 3.

Figure 3:
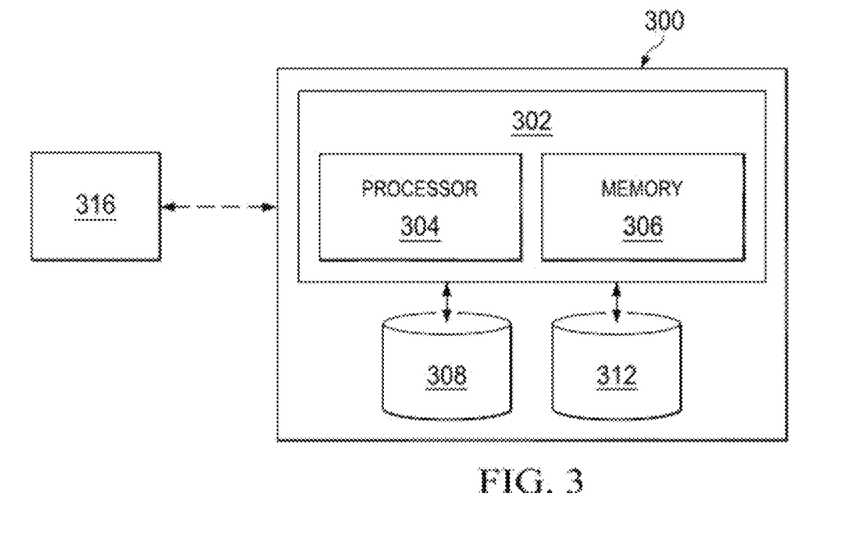
FIG. 3 illustrates a block diagram of an exemplary modeling and control system, in accordance with some embodiments of the present disclosure.

FIG. 3 illustrates a block diagram of an exemplary control unit 300 in accordance with some embodiments of the present disclosure. In certain example embodiments, control unit 300 may be configured to create, maintain, an earth model, which, in turn, may include modeled fractures and modeled reservoirs. In other example embodiments, control unit 300 may be configured to control the operation of one or more sensors along drillstring 103 during a drilling operation or another downhole operation. In some embodiments, control unit 300 may include control system 302. Control system 302 may include any suitable components. For example, in some embodiments, control system 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out the design of a vibration control system for a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Control unit 300 may further include model database 312. Model database 312 may be communicatively coupled to sensor control system 302 and may provide models of the drillstring, borehole, subsurface formation, the earth, fractures, reservoirs, or other properties of interest. Model database 312 may be implemented in any suitable manner, such as by functions, instructions, logic, or code, and may be stored in, for example, a relational database, file, application programming interface, library, shared library, record, data structure, service, software-as-service, or any other suitable mechanism. Model database 312 may include code for controlling its operation such as functions, instructions, or logic. Model database 312 may specify any suitable properties of the drillstring, borehole, or subsurface formation that may be used to determine the number, placement, or operation of sensors along the drillstring 103. Although control unit 300 is illustrated as including two databases, control unit 300 may contain any suitable number of databases.

In some embodiments, control system 302 may be configured to generate signals to control drilling or completion operations. In certain example embodiments, control system 302 may be configured to make such a determination based on one or more instances of prior well database 308, and/or one or more instances of model database 312. Values from prior well database 308, and/or model database 312 may be stored in memory 306. Control system 302 may be further configured to cause processor 304 to execute program instructions operable Control unit 300 may be communicatively coupled to one or more displays 316 such that information processed by sensor control system 302 may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general purpose circuit or components of a general purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Figure 4:
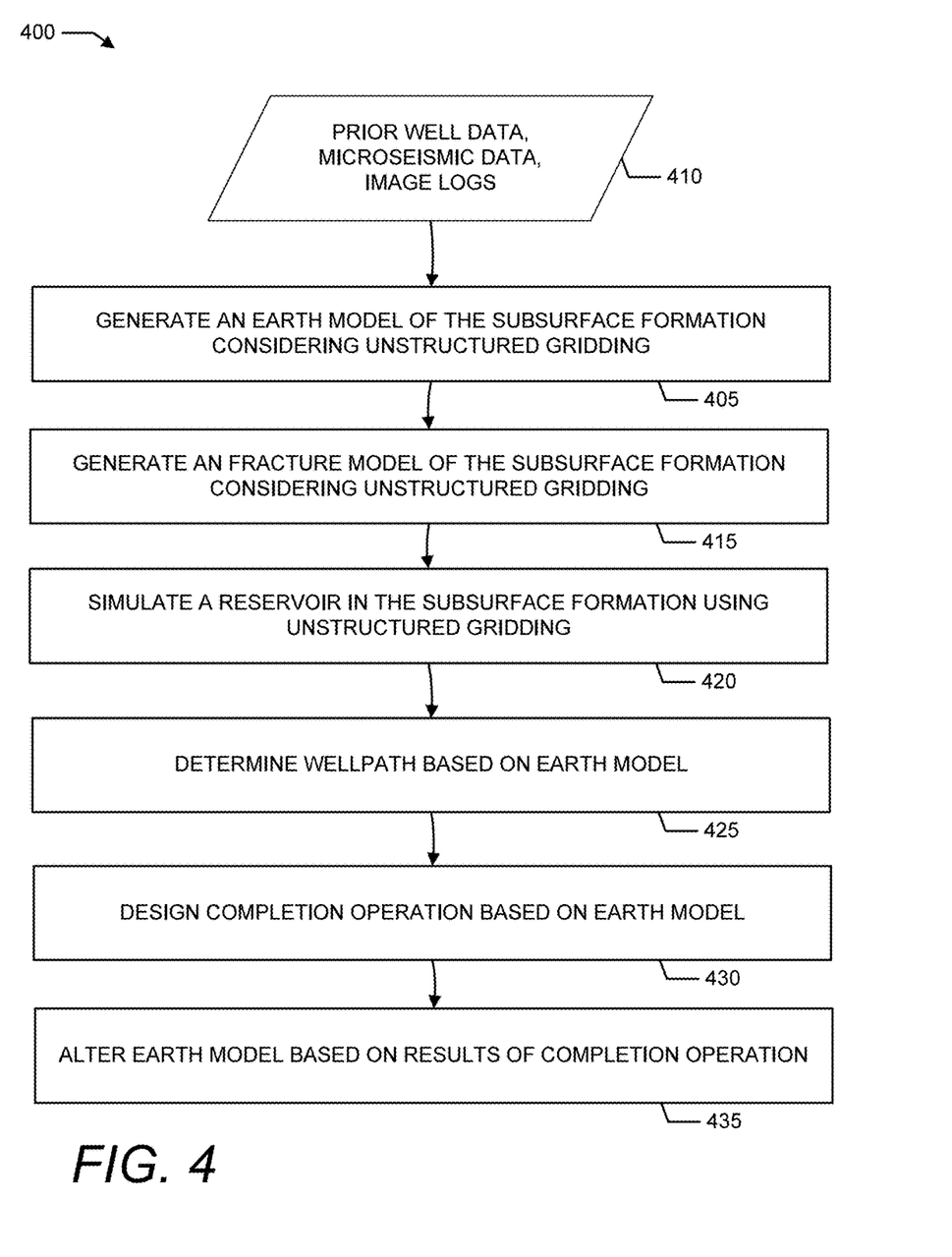
FIG. 4 is a flow chart illustrating an example method of modeling complex fractures according to the present disclosure.

FIG. 4 is a flow chart illustrating an example method of modeling complex fractures according to the present disclosure. In block 405, the system generates an earth model of the subsurface formation considering unstructured gridding. The earth model includes a plurality of cells to represent areas in the subsurface formation. An unstructured grid is a grid where the cells across the grid are not of a uniform size and shape. This feature of an unstructured grid may allow for better modeling of subsurface formations. In certain example embodiments, the earth model is used as a collaborative hub to house and communicate data and information across the development of an asset. Example earth models are based on data from geology, geophysics, drilling, fracture modeling and completions, as well as reservoir simulation. Certain example embodiments of the earth model accept and reflect data from one or more of these disciplines.

In certain example embodiments, the earth model is based, at least in part, on inputs 410. Example inputs 410 include prior well data, which may be from nearby wells. Other example inputs 410 include microseismic data collected during a completion or enhancement operation of the current or another well. Other example inputs 410 include one or more image logs of the present well or of anther well. Example image logs may include formation micro-resistivity image log. Other example image logs may include SP or Gamma logs. Other example inputs 410 that may inform the earth model are described later in this disclosure.

The integration of geophysical, geological, and petrophysical data to fill the inter-well space in the context of a present-day sealed structural framework is the primary function of a static earth model. It also provides the input to downstream operations, such as well planning and dynamic flow simulation For unconventional resources, additional data types, such as mechanical properties and natural fractures, can be integrated, thus being essential in completion planning.

In certain example embodiments, the earth model of the present disclosure is an integrated earth model with an ability to operate in a workflow connecting both the upstream and downstream components, such as the inputs, fracturing modeling, and reservoir modeling. In some embodiments, the earth model may be presented as a three-dimensional visualization. In some embodiments, the earth model is updated to account for new data.

In certain example embodiments, the data used to distribute geological facies or petrophysical rock properties in the earth model may come from interpreted well logs and cores. Such sources of information may be referred to as "hard data." In some example embodiments, a seismic survey of the subterranean formation may have been performed. In such a situation, a variety of attributes can be calculated that relate to facies or petrophysical properties of the subsurface formation. This derived data may generally be referred to as "soft data." These data serve as input into algorithms designed to "predict" the values of key attributes away from the points of known control, such as well data and cores. A variety of algorithms can accomplish this, but generally these are geostatistically based. They can be deterministic (kriging) or stochastic (conditional simulation). Geostatistical algorithms ensure that spatial relationships, fundamental to the depositional environment and the diagenetic history, are preserved, particularly in the presence of heterogeneity. Stochastic geostatistical methods allow for both discontinuous and continuous properties to be populated and elucidate the probabilities of heterogeneous subsurface properties. Typical properties modeled in conventional reservoirs are facies, porosity, and permeability. Once the properties are distributed across the framework and mesh, volumetric calculations can be made, well plans constructed, as input into a dynamic flow simulator or other downstream operations. The models can be upscaled when necessary for flow simulation and also updated with the results from the most current activity or from the introduction of new data from other sources.

In certain example embodiments, unconventional reservoir models require more information and generally higher resolution (smaller cell sizes) and might not require "blocking." Unlike traditional reservoirs, more emphasis may be given to mechanical rock properties that measure components of elasticity and non-elasticity. The principal emphasis is to identify the maximum direction of stress to properly model fractures (natural and induced) so that the "fracability" or brittleness of the shale can be better understood and to describe the distribution of "static" fluid properties, their state (maturity), and their total organic content (TOC). This information allows an integrated earth model to define the location of shale "sweet-spots" for well planning and completion engineering. This task can be difficult because these data types, such as borehole images or microseismic, are often unavailable or non-existent, thus requiring strong and flexible statistical modeling capabilities within the software. In particular, data analytical methods along with uncertainty modeling are paramount to understand the breadth or variance of key variables, such as natural fractures, stress, brittleness, and fluid properties. Each variable can carry important information that is not always apparent, and when integrated together, can create a powerful "super-variable," or quality index, that can be used to identify the most probable productive targets, or sweet spots.

An earth model can provide a platform for communication across disciplines. The earth model shows a non-geologist a representation of the reservoir in a 3D context instead of collapsed two-dimensional (2D) views (e.g., traditional contoured map, etc.). The integration of all of these data from the framework to the mesh, from predicting traditional rock properties to non-traditional rock properties, from modeling the natural fractures to the integration of hydraulic fractures, and from well planning to completion engineering and flow simulation, can be created through a comprehensive workflow in combination with a fully integrated earth model. Here, the earth model serves as a central operational and collaboration hub, constantly being updated to provide the most current information necessary for proposing the next step in a field development plan and understanding the economic value of the asset.

In certain embodiments, the system maintains an earth model to map what networks have been created, as well as model future well stimulation and visualize what the results may be in comparison to existing wells. A maintained earth model that can visualize estimations of the fracture networks created may assist in decisions at the point when in field drilling or restimulation efforts are undertaken.

Example embodiment of the present disclosure integrate the fracture models generated by the complex fracture modeling suite with the earth model data obtained from geological, geophysical and petrophysical data analysis and also the wellbore and completions data. Because the complex fracture modeling software can generate several realizations, the system of the present disclosure can be used to history match and narrow down the uncertainties in the models not only at the beginning of production but at various times within the production period to capture the dynamic changes in the reservoir in a more realistic manner.

In certain example embodiments where the earth model changes over time and presents an updated description of an asset, adjustments to the estimated fracture networks can also be updated over time to correlate to known losses of conductivity seen during production history matching. These losses of conductivity can be visualized as a loss of stimulated, and currently productive, fracture networks geometries due to any number of producing well issues such as, proppant embedment, fracture closure, proppant crushing, or proppant pack loss due to sand production. This would result in the earth model becoming a road map of sorts for refracturing candidate selection. These adjustments would be facilitated with results from production matching, proppant transport models, proppant loss and production models, etc.

When combining new generation fracture modeling and fracture network descriptions with earth modeling capabilities, asset planning and maintenance becomes a more design to fit process and dependent on reactionary corrective measures. Before stimulation plans become more focused on proper stimulation placement at each interval to not only maximize a wells results, but also in relation to surrounding wells. Restimulation and asset maintenance plans also become fit for design by allowing for more accurate selection of candidate wells and updated descriptions of wells can be visualized; all of this resulting in a more efficient and planned asset exploitation for operators.

In block 415, the system generates a fracture model of the subsurface formation. In certain example embodiments, the fracture model is based on considerations for unstructured gridding. Example embodiments of block 415 perform the fracture modeling in the earth model generated in block 405. In that case, the fracture model updates the earth model generated in block 405. In many unconventional reservoirs, natural fracture networks exist that make the development of conductive fractures through hydraulic fracturing complex. The existence of these natural fractures in certain reservoirs can significantly impact production, particularly liquids production. The fracture modeling of block 415 uses the benefits from the geological in-situ conditions provide to achieve a greater understanding of how the fracture network propagates, both in induced hydraulic fractures and the existing natural fracture network. In some example embodiment the fracture modeling accounts for one or more natural fractures in the subsurface formation or one or more existing induced fractures in the subsurface formation.

Figure 5:
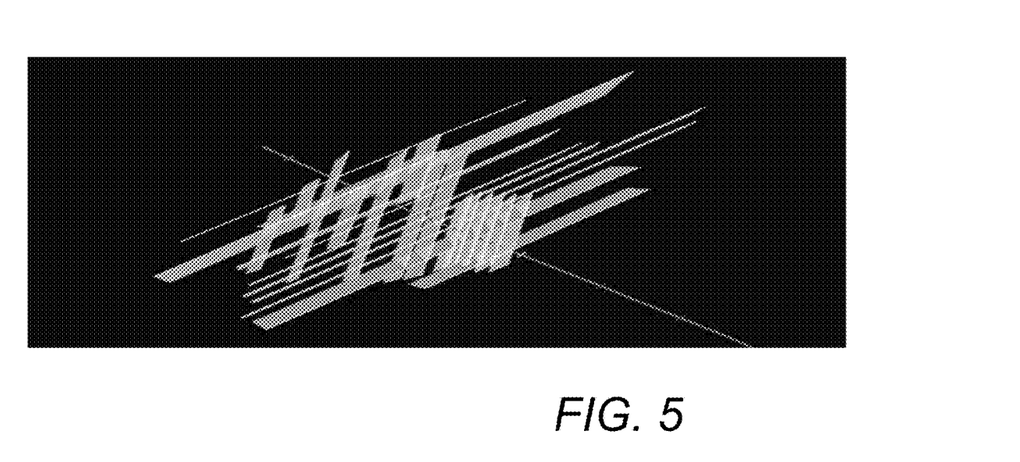
FIG. 5 illustrates a fracture pattern is represented in three-dimensional space.

Example embodiments of the fracture modeling of block 415 may use multiple data sources to describe the fracture network growth observed in unconventional reservoirs. These data can include microseismic monitoring data that helps identify fracture locations through the detection of shear events created when the formation rock is sheared by the hydraulic fracturing process. With this data, the fracture modeling of block 415 may provide descriptions of the fracture geometry, such as fracture height, length, width, dip, strike, and azimuth. This information can be obtained for multiple azimuths of fracture development within the complex fracture network. An example resulting description of this fracture pattern is represented in three-dimensional space in the software, as shown in FIG. 5.

In certain example embodiments, the interpretation of the complex fracture modeling tool is also is further based on wellbore image log data and the descriptions of the natural fractures that are found in-situ within the reservoir. Example embodiments of the fracturing modeling of block 415 may further incorporate multiple variables describing rock mechanical and reservoir properties that can be obtained through conventional data gathering methods common to the industry, such as logs, core, and sample collection. In certain example embodiments, when specific wells do not have this data, the system uses the earth-model-generated values based on advanced geostatistical tools and regional information, including seismic and geological models to perform fracture modeling.

Figure 6:
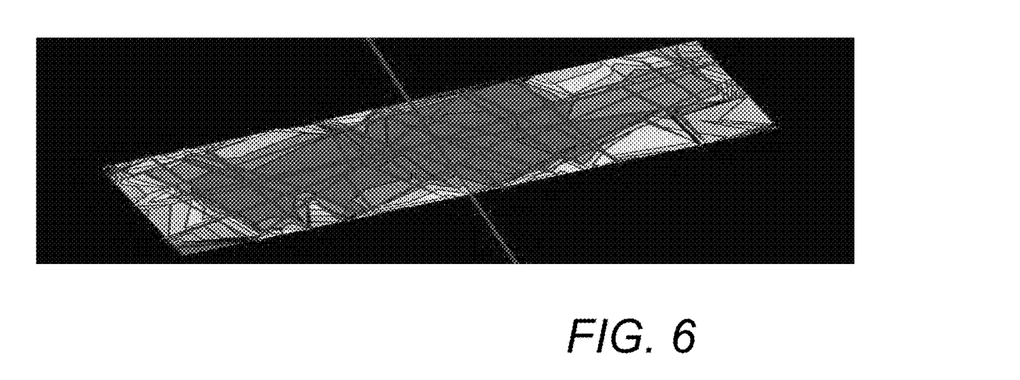
FIG. 6 illustrate an example of a resulting post-stimulation fracture network.

An example of a resulting post-stimulation fracture network is shown in FIG. 6. This figure illustrates the resulting fractures in green, and the multiple colors in the surrounding area indicate values of stress within the formation rock as a result of the fracture network development.

In certain example embodiments, after the fracture model or earth model has been populated with probable locations of natural fractures and induced fractures, as well as mechanical rock properties, the corresponding model may then be calibrated to the actual hydraulic fracturing treatment volumes and observed net pressures. The results can then be incorporated into the earth modeling platform to capture completion and reservoir information in a single location. This data may also be input into the reservoir simulator, which may be designed specifically for unconventional reservoirs, to describe the entire fracture network contributing to production. As this collaborative process is iterative, using production history matching tools in the reservoir simulator helps determine how the created fracture network influences well productivity. Following this, reservoir sensitivity analysis can be performed, varying key fracture parameters to begin a completion optimization process.

Returning to FIG. 4, in block 420, the system simulates one or more reservoirs in the subsurface formation using unstructured gridding. In certain example embodiments, understanding well performance and enabling completion optimization is achieved through reservoir simulation that takes into account the highly complex conditions encountered in unconventional reservoirs. Example reservoir simulation techniques handle the complex conditions found in these unconventional plays, such as complex pressure-volume-temperature (PVT) conditions, discrete fracture networks, and varying production drivers, through capabilities such as unstructured gridding and the inclusion of compositional fluid and multi-phase flow modeling. Reservoir simulation is a tool that can be used to help understand the impact of different fracture designs on well productivity. This is a process in which many potential solutions can be presented, depending on the information used to populate the reservoir simulator. Accounting for this, example embodiments of the present disclosure may help to create more consistent and repeatable results. These results still require careful review, but they provide key insights into how different fracture systems can impact well productivity.

In block 425, the system determines a well path based on the earth model. With an integrated model in place, a well plan can be designed. Note that an earth model may be constructed for an asset before drilling occurs to identify the "sweet spots" and assist in drilling and completion planning. The trajectory of the horizontal section is an important factor in the design and drilling of a horizontal well. If correctly guided into a "sweet spot," the well may be productive and profitable. Both depth and azimuth may be important for the lateral placement when production is entirely dependent on successful hydraulic stimulation at multiple locations along the lateral. Measurement-while-drilling (MWD) technology provides real-time information from the drill bit that can be used to steer the well during drilling, a practice often referred to as "geo-steering." This technology taps into knowledge of the geological/geophysical environment at the location of the drill bit to make subtle corrections to the well's trajectory. MWD data makes it possible to update the integrated earth model in real-time, allowing engineers to accurately stay within thin, highly stratified horizons that are hydrocarbon-rich. The ability to make these mid-course corrections can be useful for maximizing the length of the interval from which the horizontal wellbore can produce.

In block 430, the system designs a completion operation based on the earth model developed in previous block. In certain example embodiments, the system may design a completion operation in multiple stages, with varying fracturing locations and pressures for each stage. The wide range of fracture network geometries that have been observed in the complex fracture modeling process, and historically have been verified through production history matching and production logging, individual interval design can become a reality in order to get the most efficiency out of multistage horizontal wells. In-situ geological conditions impacting fracture network development can be analyzed with techniques such as formation micro-resistivity image logging. This type of investigative knowledge, combined with complex fracture network development understanding may improve interval-by-interval descriptions of the entire fracture network created in a multistage well. Section of wellbore left unstimulated (or "gaps") due to changes in in-situ complexity across a wellbore and thus the resulting fracture networks at each interval can be targeted with stimulation design changes, such as diversion, changed interval spacing, or job size. For example, an interval seen to have high in-situ complexity, low anisotropy, and a high likelihood of a complex fracture network being developed during stimulation can be realized before stimulation. With this accounted for before stimulation, models can be developed to provide a description of the anticipated fracture lengths created, propped or conductive lengths can be estimated from more traditional fracture modeling with proppant transport capabilities, and job size design changes can be made pre-job in order to target a goal of more uniform fracture network development at each interval along the wellbore In block 435, the system alters the earth model based on data gathered during the enhancement operation. In certain example implementations, the system monitors the volumes of fluid injected into the reservoir and the fracturing pressures during the enhancement operation. Based on these measurements, the system alters the earth model.

Modifications, additions, or omissions may be made the method of FIG. 4 without departing from the scope of the present disclosure. For example, the order of the steps may be performed in a different manner than that described and some steps may be performed at the same time. Additionally, each individual step may include additional steps without departing from the scope of the present disclosure. In certain embodiments, one or more steps of FIG. 4 may be omitted.

Figure 7:
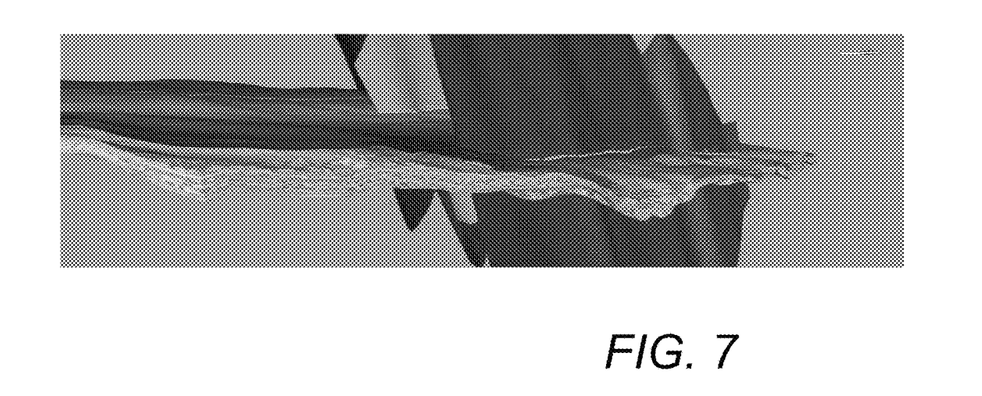
FIG. 7 illustrates a three-dimensional geocellular earth model showing the framework and distribution of matrix porosity.

FIG. 7 illustrates a three-dimensional geocellular earth model showing the framework and distribution of matrix porosity. The earth model of FIG. 7 may be generated based on the method of FIG. 4. The earth model of FIG. 7 includes fractures representing a complex fracture network, similar to the fracture network shown in FIG. 6.

Figure 8:
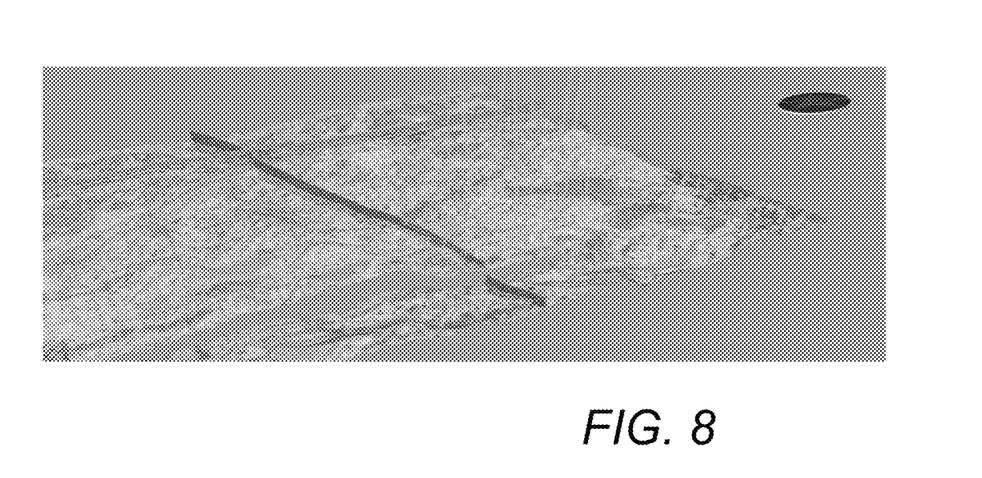
FIG. 8 illustrates an earth model that shows the distribution of shale quality and planned wells in the subsurface formation.

FIG. 8 illustrates an earth model that shows the distribution of shale quality index and planned wells in the subsurface formation. The earth model of FIG. 7 may be generated based on the method of FIG. 4.

Figure 9A:
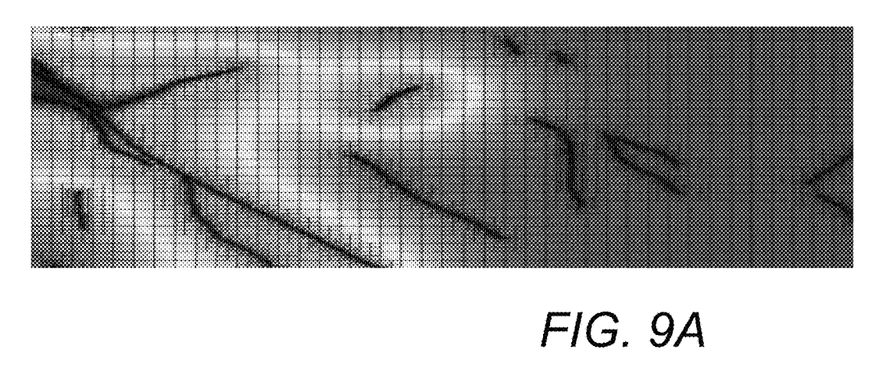
FIG. 9A is a regular mesh model showing the distribution of natural and hydraulic fractures in a subsurface formation.
Figure 9B:
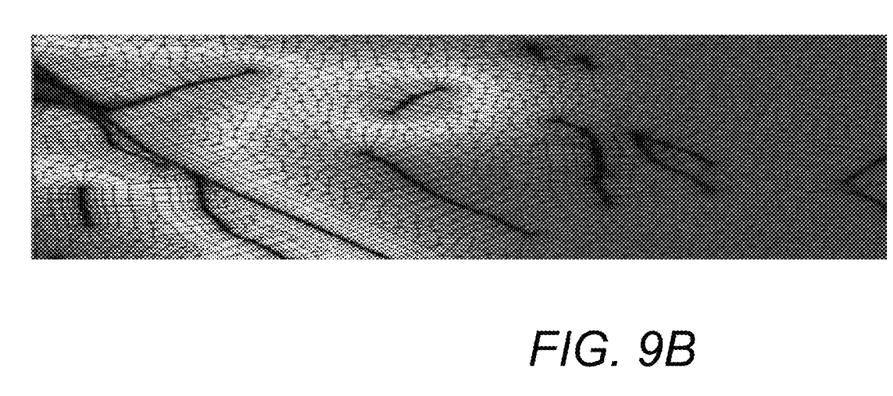
FIG. 9B is an unstructured mesh model showing the distribution of both natural and hydraulic fractures in a subsurface formation.

FIG. 9A is a regular mesh model showing the distribution of natural and hydraulic fractures in a subsurface formation. FIG. 9B is an unstructured mesh model showing the distribution of both natural and hydraulic fractures in a subsurface formation. The models of FIGS. 9A and 9B may be determined based on the method of FIG. 4.

Figure 10A:
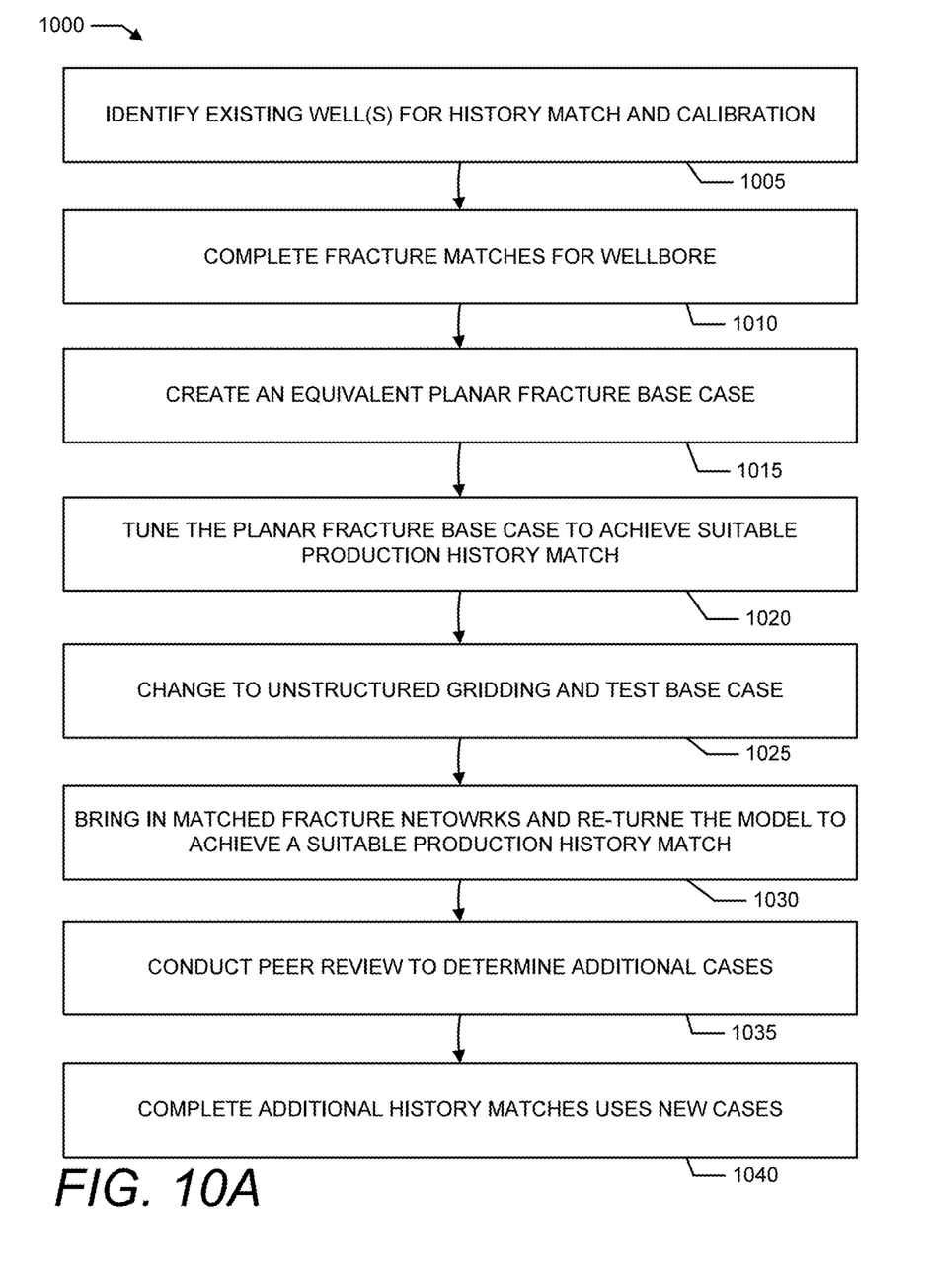
FIGS. 10A and 10B are a block diagram of an exemplary reservoir simulation and fracture design optimization procedure according to the present disclosure.
Figure 10B:
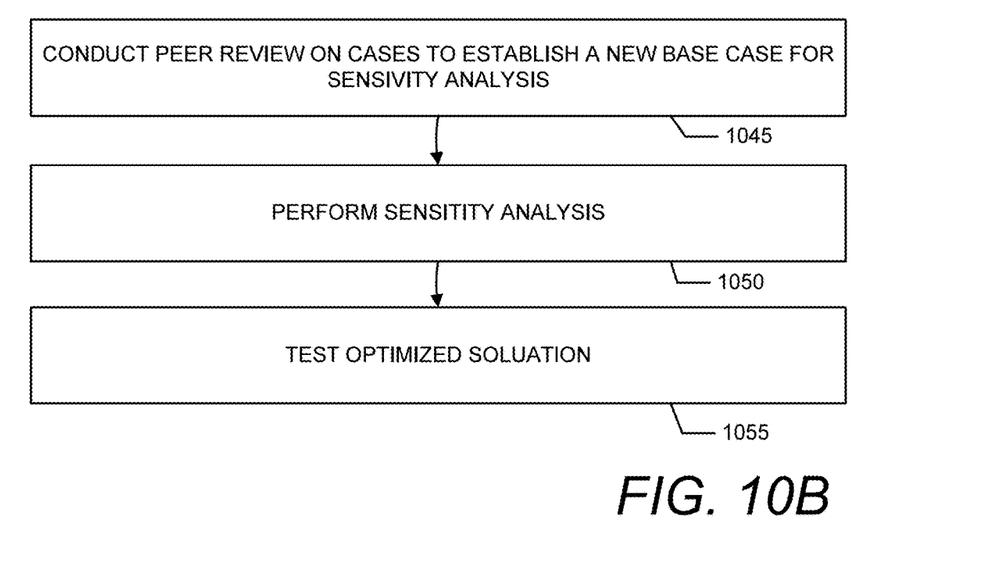

An example workflow for reservoir simulation and fracture design optimization is shown in FIGS. 10A and 10B. In block 1005, the system identifies an existing well with good production data for initial history match and calibration. In block 1010, the system completes fracture matches for the entire wellbore. In certain example embodiments the system incorporates available data. In block 1015, the system creates an equivalent planar fracture base case within the reservoir simulator. In block 1020, the system tunes the planar fracture base case to achieve a suitable production history match. In certain example embodiments, the system captures reasonable calibration values for reservoir properties using conventional structured gridding solutions. In block 1025, the system changes to unstructured gridding and thereafter test the base case to ensure results are consistent. In block 1030, the system brings in matched fracture networks and re-tunes the model to achieve a suitable production history match. In block 1035, the system conducts a peer review to determine additional cases to solve to achieve better insight into fracture influence on well production. In block 1040, the system completes additional history matches using new cases defined in block 1035. In block 1045, the system conducts a peer review to establish a new base case for sensitivity analysis. In block 1050, the system performs a sensitivity analysis. In certain example embodiments, the system varies multiple fracture parameters to assess their impact on production performance. In certain embodiments the system establishes a plan for completion design optimization. In block 1055, the system test the optimized solution. In certain example embodiments, the system observes the predicted well performance and economic impact.

Modifications, additions, or omissions may be made the method of FIG. 10 without departing from the scope of the present disclosure. For example, the order of the steps may be performed in a different manner than that described and some steps may be performed at the same time. Additionally, each individual step may include additional steps without departing from the scope of the present disclosure. In certain embodiments, one or more steps of FIG. 10 may be omitted.

The systems and method of the present disclosure may be deployed to help improve completion design and well performance. In certain example embodiments, a complex fracture network is modeled for the local region, incorporating available microseismic information collected during fracturing operations to help constrain the fracture model. The properties of the fracture network are used to build a reservoir simulation model, initially in a structured grid. For the base-case structured grid simulation model, the fracture network is represented as bi-wing planar fractures transverse to the wellbore with no secondary fracture system. This process is performed to obtain a general idea about the key reservoir properties, such as initial water saturation, matrix permeability, and relative permeability curves. Bottomhole pressure (BHP) data, calculated using a commercial nodal analysis software, using the historical production rates and tubing-head pressure (THP), may be used as a constraint, and the three simulator-calculated production rates (oil, water, and gas) were matched to the historical production rates. The PVT tables generated during the data preparation step were also incorporated into the base-case compositional reservoir simulation model. In addition, average reservoir properties were calculated for the entire reservoir, such as porosity, permeability, saturations, etc. One homogeneous reservoir layer with these average reservoir properties was used for the purpose of simplifying the base-case simulation model. The fracture geometry and properties were characterized for each stage and applied to the treatment interval (for example, if a given treatment interval had a half-length of 650 ft, then the fractures located within the measured depths of the treatment interval had a fracture half-length of 650 ft).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method for modeling a fracturing operation in a subsurface formation, comprising:
   generating an earth model of the subsurface formation, wherein the earth model is generated based on considerations for unstructured gridding;
   generating a fracture model of the subsurface formation based, at least in part, on the earth model of the subsurface formation, and wherein the fracture model is generated based on considerations for unstructured gridding; and
   performing a reservoir simulation of at least one reservoir in the subsurface formation based, at least in part, on the earth model and the fracture model, wherein the reservoir simulation is performed using unstructured gridding, wherein the unstructured gridding permits cells across a grid that are not of a uniform size and shape.

2. The method of claim 1, wherein the earth model of the subsurface formation includes at least one natural fracture represented by considerations for unstructured gridding; and wherein generating a fracture model of the subsurface formation accounts for the at least one natural fracture in the subsurface formation, wherein the at least on natural fracture is part of an existing natural fracture network.

3. The method of claim 1, wherein the earth model of the subsurface formation includes at least one existing hydraulically-induced fracture represented by considerations for unstructured gridding; and wherein generating a fracture model of the subsurface formation accounts for the presence of at least one existing hydraulically-induced fracture.

4. The method of claim 1, further comprising:
   receiving microseismic data, wherein the microseismic data is recorded during a fracturing operation of the subsurface formation; and
   updating the earth model of the subsurface formation based, at least in part, on the earth model of the subsurface formation is based, at least in part, on the microseismic data.

5. The method of claim 1, further comprising:
   receiving an image log of the subsurface formation; and
   wherein generating a fracture model of the subsurface formation based, at least in part, on the earth model of the subsurface formation is based, at least in part, on the image log.

6. The method of claim 5, wherein the image log is a formation micro-resistivity image log of the subsurface formation.

7. The method of claim 1, further comprising:
   determining a well path into the subsurface formation based, at least in part, on the earth model.

8. The method of claim 1, further comprising:
   performing a completion operation in the subsurface formation based, at least in part, on the fracture model;
   measuring one or more volumes and pressures during the completion operation; and
   updating the earth model, based on the volumes and pressures measured during the completion operation.

9. The method of claim 1, wherein performing a reservoir simulation of at least one reservoir in the subsurface formation is further based, at least in part, on a production history of one or more existing wells.

10. A system for planning a fracturing operation in a subsurface formation, comprising:
- at least one processor;
- a memory including non-transitory executable instructions that, when executed, cause the at least one processor to:
  - generate an earth model of the subsurface formation, wherein the earth model is generated based on considerations for unstructured gridding;
  - generate a fracture model of the subsurface formation based, at least in part, on the earth model of the subsurface formation, and wherein the fracture model is generated based on considerations for unstructured gridding; and
  - perform a reservoir simulation of at least one reservoir in the subsurface formation based, at least in part, on the earth model and the fracture model, wherein the reservoir simulation is performed using unstructured gridding, wherein the unstructured gridding permits cells across a grid that are not of a uniform size and shape.

11. The system of claim 10, wherein the earth model of the subsurface formation includes at least one natural fracture represented by considerations for unstructured gridding; and wherein the executable instruction's that cause the at least one processor to generate a fracture model of the subsurface formation are further based on at least one natural fracture in the subsurface formation, wherein the at least on natural fracture is part of an existing natural fracture network.

12. The system of claim 10, wherein the earth model of the subsurface formation includes at least one natural fracture represented by considerations for unstructured gridding; and wherein the executable instruction's that cause the at least one processor to generate a fracture model of the subsurface formation are further based on at least one existing hydraulically-induced fracture.

13. The system of claim 10, wherein the executable instructions further cause the at least one processor to:
- receive microseismic data, wherein the microseismic data is recorded during a fracturing operation of the subsurface formation; and
- update the earth model of the subsurface formation based, at least in part, on the earth model of the subsurface formation is based, at least in part, on the microseismic data.

14. The system of claim 10, wherein the executable instructions further cause the at least one processor to:
- receive an image log of the subsurface formation; and
- wherein generating a fracture model of the subsurface formation based, at least in part, on the earth model of the subsurface formation is based, at least in part, on the image log.

15. The system of claim 14, wherein the image log is a formation micro-resistivity image log of the subsurface formation.

16. The system of claim 10, wherein the executable instructions further cause the at least one processor to:
- determine a well path into the subsurface formation based, at least in part, on the earth model.

17. The system of claim 10, wherein the executable instructions further cause the at least one processor to:
- perform a completion operation in the subsurface formation based, at least in part, on the fracture model;
- measure one or more volumes and pressures during the completion operation; and
- update the earth model, based on the volumes and pressures measured during the completion operation.

18. The system of claim 10, wherein the executable instructions that cause the at least one processor to perform a reservoir simulation of at least one reservoir in the subsurface formation are further based, at least in part, on a production history of one or more existing wells.

19. A non-transitory computer-readable medium storing instructions that, when executed by at least on processor, perform operations comprising:
- generating an earth model of the subsurface formation, wherein the earth model is generated based on considerations for unstructured gridding;
- generating a fracture model of the subsurface formation based, at least in part, on the earth model of the subsurface formation, and wherein the fracture model is generated based on considerations for unstructured gridding; and
- performing a reservoir simulation of at least one reservoir in the subsurface formation based, at least in part, on the earth model and the fracture model, wherein the reservoir simulation is performed using unstructured gridding, wherein the unstructured gridding permits cells across a grid that are not of a uniform size and shape.

20. The computer-readable medium of claim 19, wherein the earth model of the subsurface formation includes at least one natural fracture represented by considerations for unstructured gridding; and wherein generating a fracture model of the subsurface formation accounts for the at least one natural fracture in the subsurface formation, wherein the at least on natural fracture is part of an existing natural fracture network.

* * * * *